(12) United States Patent
Hsu et al.

(10) Patent No.: US 12,051,944 B2
(45) Date of Patent: Jul. 30, 2024

(54) ROTOR, MOTOR, AND DRIVE DEVICE

(71) Applicant: Nidec Corporation, Kyoto (JP)

(72) Inventors: Yu-Wei Hsu, Taipei (TW); Ta-Yin Luo, Taipei (TW); Hsin-Nan Lin, Taipei (TW); Sheng-Chan Yen, Taipei (TW); Guo-Jhih Yan, Taipei (TW); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 348 days.

(21) Appl. No.: 17/635,015

(22) PCT Filed: Aug. 27, 2020

(86) PCT No.: PCT/JP2020/032467
§ 371 (c)(1),
(2) Date: Feb. 14, 2022

(87) PCT Pub. No.: WO2021/039930
PCT Pub. Date: Mar. 4, 2021

(65) Prior Publication Data
US 2022/0294288 A1    Sep. 15, 2022

(30) Foreign Application Priority Data
Aug. 28, 2019 (CN) .......................... 201910801529.6

(51) Int. Cl.
*H02K 1/276*    (2022.01)
*H02K 21/14*    (2006.01)
*H02K 29/03*    (2006.01)

(52) U.S. Cl.
CPC ........... *H02K 1/2766* (2013.01); *H02K 21/14* (2013.01); *H02K 29/03* (2013.01)

(58) Field of Classification Search
CPC ...... H02K 1/2766; H02K 21/14; H02K 29/03; H02K 1/246; H02K 1/276; H02K 21/028; H02K 2213/03
See application file for complete search history.

(56) References Cited

U.S. PATENT DOCUMENTS 5,945,760 A    8/1999 Honda et al.
6,836,045 B2    12/2004 Murakami et al.
(Continued)

FOREIGN PATENT DOCUMENTS

CN    108141073 A    6/2018
JP    8-336246 A    12/1996
(Continued)

OTHER PUBLICATIONS

Official Communication issued in International Patent Application No. PCT/JP2020/032467 mailed on Oct. 20, 2020.

*Primary Examiner* — Mohamad A Musleh
(74) *Attorney, Agent, or Firm* — Keating & Bennett, LLP

(57) ABSTRACT

A rotor includes a stack of electromagnetic steel plates each including through-hole groups with through-holes extending through the respective electromagnetic steel plates. In each of the through-hole groups, at least one of the through-holes accommodates a magnet and at least a portion of the through-holes that does not accommodate any magnet is filled with an electrically conductive material. When the rotor is seen axially, at two circumferential sides of a magnetic flux passage that is adjacent to the magnet, a width of the magnetic flux passage adjacent a first side of the magnet is larger than a width of the magnetic flux passage near a second side of the magnet.

12 Claims, 12 Drawing Sheets

(56) References Cited

U.S. PATENT DOCUMENTS

| | | |
|---|---|---|
| 10,411,534 B2 | 9/2019 | Nakano et al. |
| 2006/0043812 A1 | 3/2006 | Cheong et al. |

FOREIGN PATENT DOCUMENTS

| | | | |
|---|---|---|---|
| JP | 08-336246 A | 12/1996 | |
| JP | 2000-270525 A | 9/2000 | |
| JP | 2002-044920 A | 2/2002 | |
| JP | 2006-67772 A | 3/2006 | |
| JP | 2006-121765 A | 5/2006 | |
| JP | 2008-211934 A | 9/2008 | |
| JP | 2010-158085 A | 7/2010 | |
| JP | 2011-199946 A | 10/2011 | |
| WO | WO-2016047078 A1 * | 3/2016 | ............... H02K 1/16 |
| WO | WO-2017061305 A1 * | 4/2017 | ............. H02K 1/274 |

* cited by examiner

ROTOR, MOTOR, AND DRIVE DEVICE

CROSS-REFERENCE TO RELATED APPLICATIONS

This is a U.S. national stage of application No. PCT/JP2020/032467, filed on Aug. 27, 2020, with priority under 35 U.S.C. § 119(a) and 35 U.S.C. § 365(b) being claimed from CN Patent Application No. 201910801529.6, filed on Aug. 28, 2019, the entire disclosures of which are hereby incorporated herein by reference.

FIELD OF THE INVENTION

The present disclosure relates to the field of motors.

BACKGROUND

A known synchronous reluctance motor includes a rotor including an electromagnetic steel plate having at its center a plurality of through-holes that form air gaps called magnetic flux barriers. These air gaps cause a difference in reluctance. When an electric current is fed to the motor, the motor produces a reluctance torque owing to the difference in reluctance.

In the technical background, a magnet is inserted in a magnetic flux barrier for further improving the efficiency of a motor and increasing a power coefficient of the motor. The magnet generates an extra magnetic flux to produce a magnetic flux torque. An output from the motor thus contains a combination of a reluctance torque and the magnetic flux torque, which leads to higher efficiency.

Presently, a magnet-assisted synchronous reluctance motor has a magnetic flux by a magnet in addition to a magnetic flux by a stator during its rotation because of insertion of the magnet. When the magnetic flux by the magnet merges with the magnetic flux by the stator, the magnetic flux significantly increases in the rotating direction of a rotor, so that a magnetic flux density in the rotating direction is excessively saturated. This hinders improvement in performance of the motor through the effective use of the magnet.

In order to suppress the excessive saturation of the magnetic flux density in the rotating direction, it has presently been proposed to insert magnets of different sizes into magnetic flux barriers, thereby adjusting the optimal number of usable magnets. It has also been proposed that a rib structure provided in a magnetic flux barrier of a rotor allows distribution of a part of a magnetic flux generated from a magnet.

It should be noted that the foregoing introduction on the technical background is merely for the convenience of a clear and complete description of the technical solutions of example embodiments of the present application, and for the convenience of the understanding by those skilled in the art. The foregoing technical solutions cannot be considered to be publicly known to those skilled in the art simply because they are described in the technical background section of the present application.

SUMMARY

The inventors of example embodiments of the present disclosure discovered disadvantages in previously known motor structures. In previously known motor structures, since the magnets of various sizes are required, it cannot be said that this technical solution is convenient from the viewpoint of mass production. In addition, some of the magnets having larger sizes may affect the self-starting characteristic of the motor. Further, the addition of the rib significantly changes and modifies the structure of the rotor, which may affect the reluctance characteristic of the motor and may weaken a reluctance torque.

Example embodiments of the present disclosure are able to remedy deficiencies in previously known motor structures. According to an example embodiment of the present disclosure, a rotor includes a stack of electromagnetic steel plates each including through-hole groups with through-holes extending through the respective electromagnetic steel plates. In each through-hole group, at least one of the through-holes accommodates a magnet and at least a portion of the through-holes which do not accommodate any magnet is filled with an electrically conductive material. When the rotor is seen axially, at two circumferential sides of a magnetic flux passage that is adjacent to the magnet, a width of the magnetic flux passage near a first side of the magnet is larger than a width of the magnetic flux passage near a second side of the magnet.

According to another example embodiment of the present disclosure, a motor includes a stacked core, a stator including pole slots arranged circumferentially, teeth provided between adjacent pairs of the pole slots, and coils accommodated in respective ones of the pole slots, and the rotor according to the example embodiment of the present disclosure described above. The rotor is radially opposite the stator and is axially rotatable about an axis of the motor.

According to still another example embodiment of the present disclosure, a drive device includes the motor according to the example embodiment of the present disclosure described above.

The above and other elements, features, steps, characteristics and advantages of the present disclosure will become more apparent from the following detailed description of the example embodiments with reference to the attached drawings.

BRIEF DESCRIPTION OF THE DRAWINGS

Specific implementations and example embodiments of the present application are disclosed in detail with reference to the following description and the accompanying drawings, and a manner in which the principles of the disclosure may be used is specified. It should be understood that the implementations and example embodiments of the present application are not limited in scope. The implementations and example embodiments of the present application include many changes, modifications, and equivalents within the spirit and term scope of the appended claims.

The included accompanying drawings are used for providing further understanding of example embodiments of the present application. The accompanying drawings constitute a part of the specification, illustrate implementations and example embodiments of the present disclosure, and exemplify the principle of the present disclosure in conjunction with literal descriptions. The accompanying drawings to be described below merely illustrate some example embodiments of the present application, and those skilled in the art may obtain other accompanying drawings according to these accompanying drawings without creative efforts.

DETAILED DESCRIPTION

The foregoing and other features of the present application will became obvious from the accompanying drawings and through the following description. In the following description and the accompanying drawings, specific implementations of the present application are disclosed in detail to show some implementations capable of adopting the principle of the present application. It should be understood that the present application is not limited to the described implementations. On the contrary, the present application involves all modifications, variations, and equivalents falling within the scope of the appended claims.

In example embodiments of the present application, the terms "first", "second", and the like are used to distinguish different elements in terms of appellation, but are not used to imply the spatial arrangement or chronological order of these elements, and these elements should not be limited by these terms. The term "and/or" includes any of or all combinations of one or more related listed items. The terms "include", "comprise", "have", and the like specify the existence of the described features, elements, or components, but do not exclude the existence or addition of one or more other features, elements or components.

In example embodiments of the present application, singular forms such as "a" and "the" may include a plural form, which are understood broadly as "a kind" or "a class" instead of limiting to a meaning of "one". In addition, it should be understood that the term "the" includes both the singular form and the plural form, unless the context clearly dictates otherwise. In addition, the term "according to" should be understood as "at least partially according to . . . ", and the term "based on" should be understood as "at least partially based on . . . ", unless the context clearly dictates otherwise.

In the following description of the present application, for convenience of the description, the terms "axial", "axially", and "axial direction" refer to a direction in which a center axis of a rotor (a motor) extends or that is parallel to the center axis, the terms "radial", "radially", and "radial direction" refer to a radial direction centered on the center axis, and the terms "circumferential", "circumferentially", and "circumferential direction" refer to a direction around the center axis. It should be noted that these terms are merely defined for convenience of the description and are not intended to limit an orientation of a rotor (a motor) in use and during manufacturing.

An example embodiment of a first aspect of the present application provides a rotor.

Figure 1A:
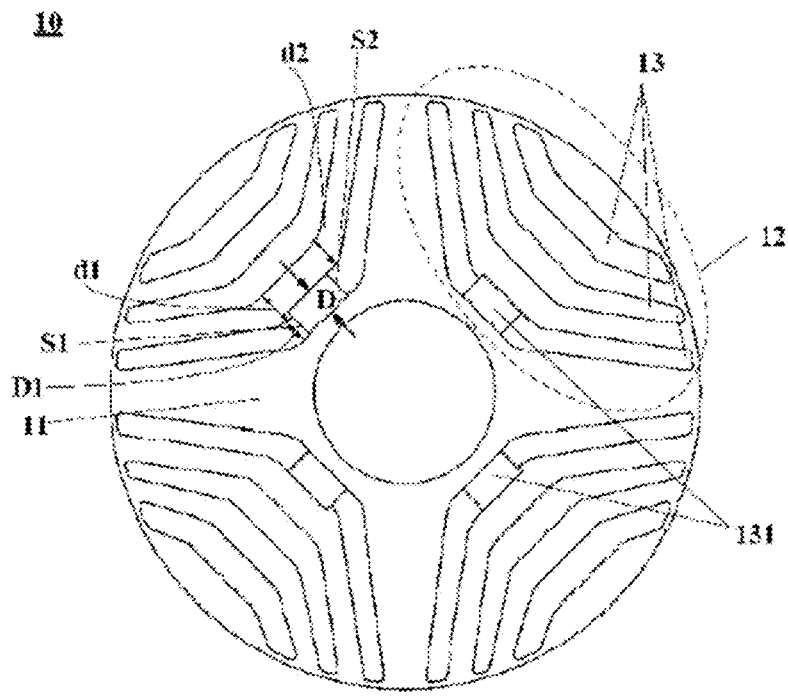
FIG. 1A is a plan view of a rotor according to an example embodiment of a first aspect of the present application.
Figure 1B:
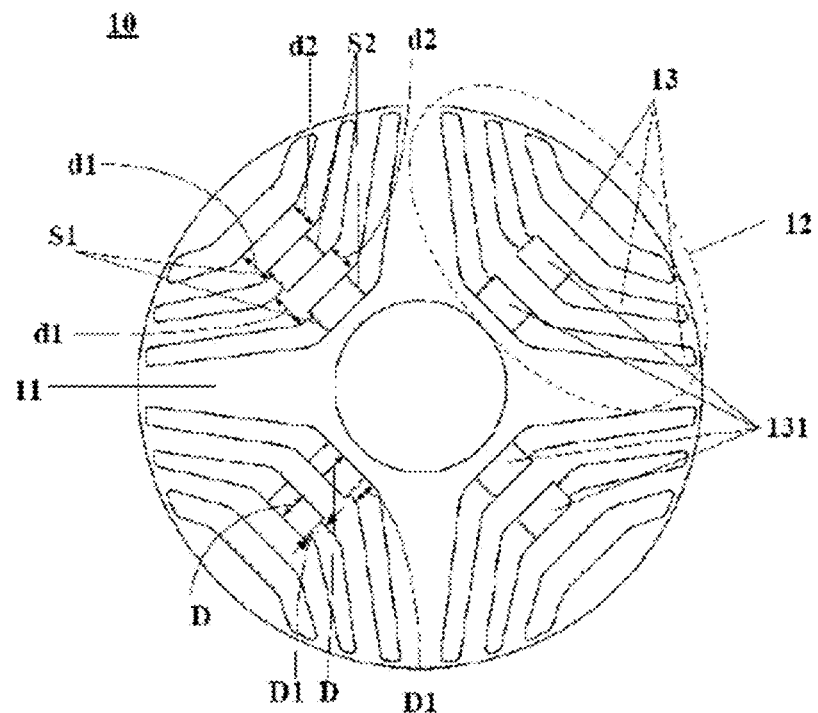
FIG. 1B is a plan view of a rotor according to the example embodiment of the first aspect of the present application.
Figure 1C:
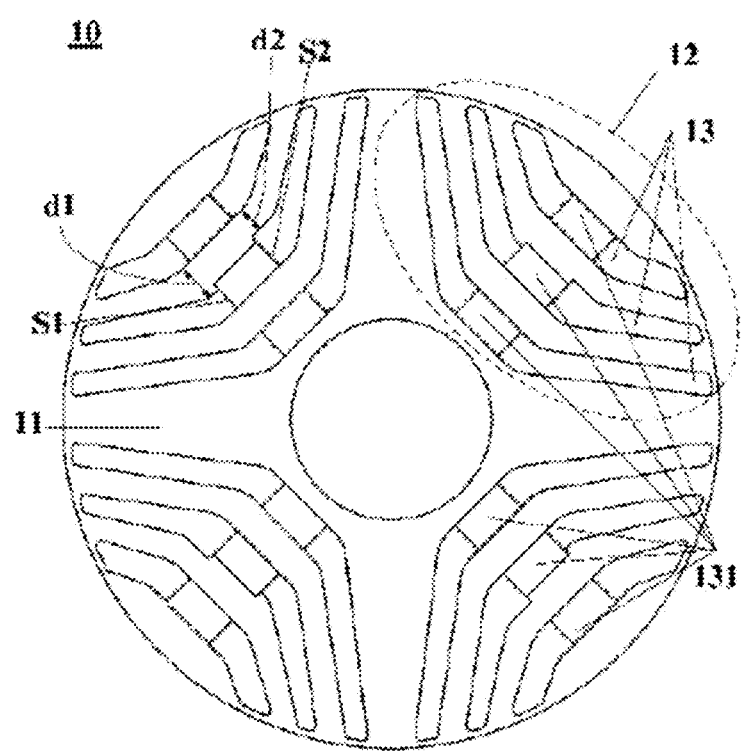
FIG. 1C is a plan view of a rotor according to the example embodiment of the first aspect of the present application.
Figure 2A:
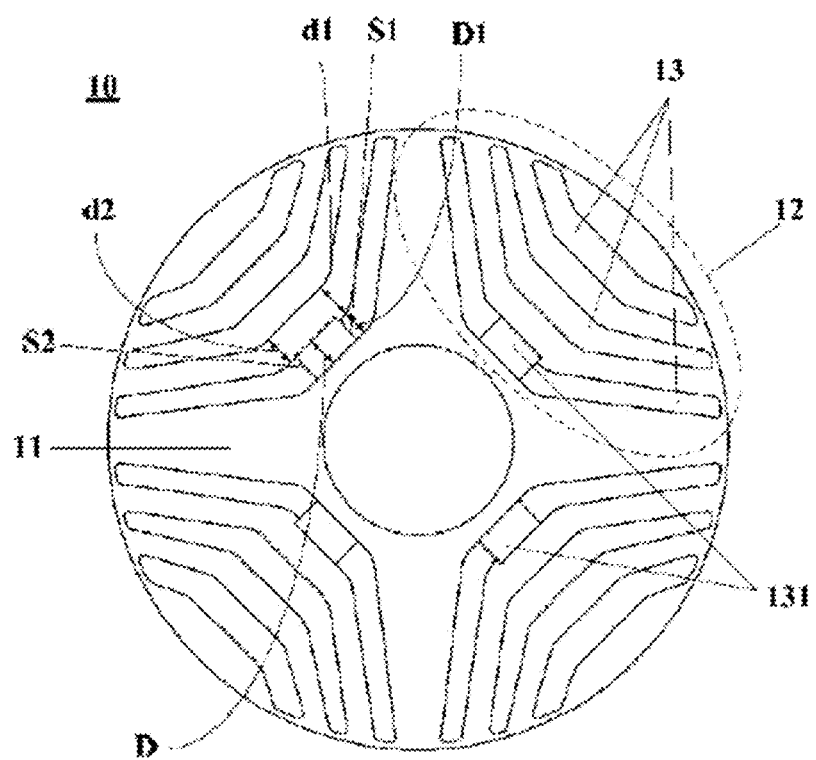
FIG. 2A is a plan view of another rotor according to the example embodiment of the first aspect of the present application.
Figure 2B:
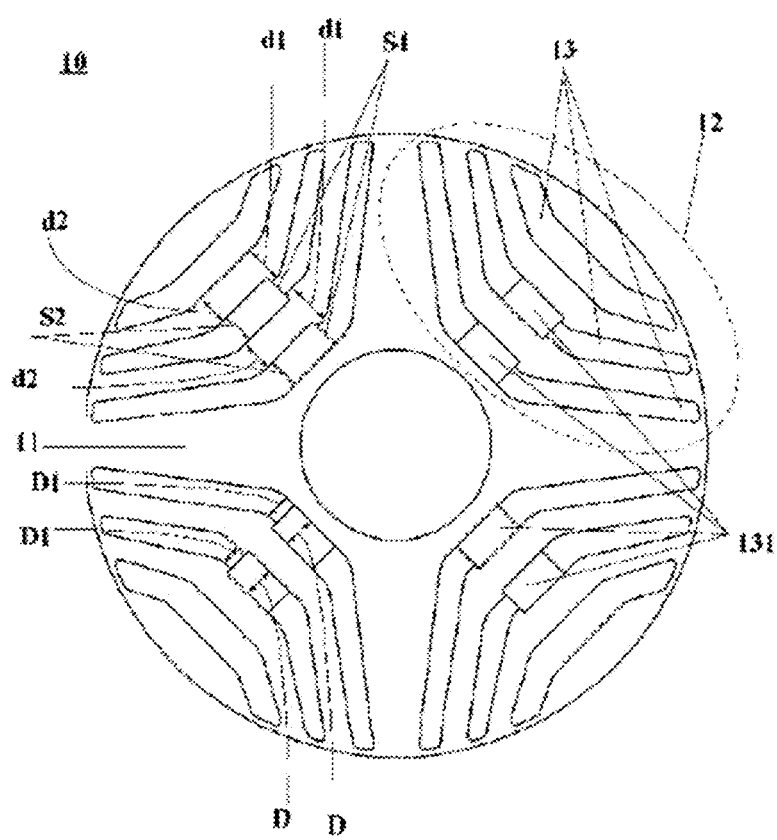
FIG. 2B is a plan view of another rotor according to the example embodiment of the first aspect of the present application.
Figure 2C:
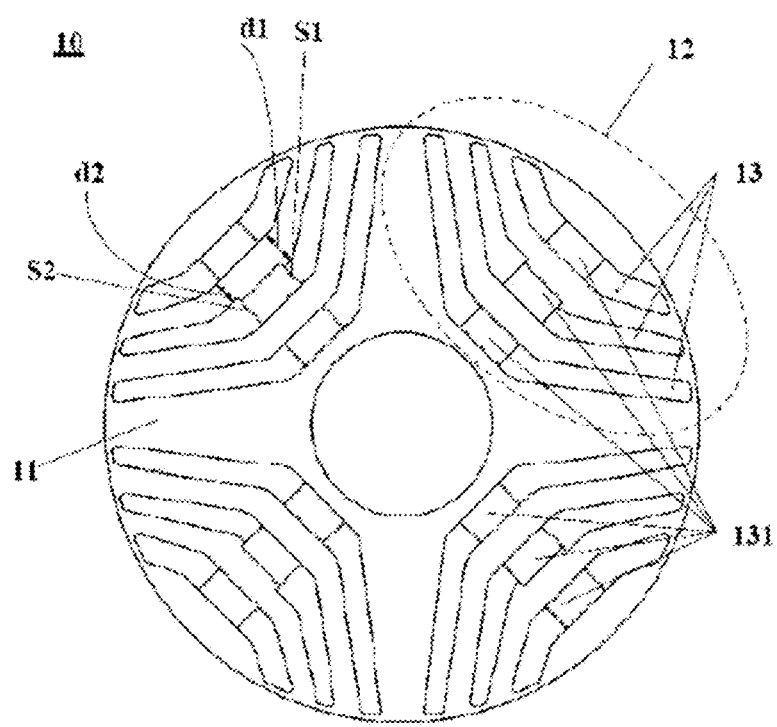
FIG. 2C is a plan view of another rotor according to the example embodiment of the first aspect of the present application.

FIGS. 1A, 1B, and 1C are plan views of an exemplary rotor according to the example embodiment of the first aspect of the present application. FIG. 1A illustrates a state in which magnets are accommodated in one layer. FIG. 1B illustrates a state in which magnets are accommodated in two layers. FIG. 1C illustrates a state in which magnets are accommodated in three layers. FIGS. 2A, 2B, and 2C are plan views of another exemplary rotor according to the example embodiment of the first aspect of the present application. FIG. 2A illustrates a state in which magnets are accommodated in one layer. FIG. 2B illustrates a state in which magnets are accommodated in two layers. FIG. 2C illustrates a state in which magnets are accommodated in three layers. The rotor includes electromagnetic steel plates axially stacked on top of each other. Therefore, FIGS. 1A, 1B, 1C, 2A, 2B, and 2C each illustrate an axial end face of one of the electromagnetic steel plates.

As illustrated in FIGS. 1A, 1B, 1C, 2A, 2B, and 2C, a rotor 10 includes a stack of electromagnetic steel plates 11 each having a plurality of through-hole groups 12 each including a plurality of through-holes 13 extending through the respective electromagnetic steel plates 11. As indicated by dotted frames in FIGS. 1A, 1B, and 1C, more specifically, each electromagnetic steel plate 11 has four through-hole groups 12, and each through-hole group 12 includes three through-holes 13.

As illustrated in FIGS. 1A, 1B, 1C, 2A, 2B, and 2C, in each through-hole group 12, at least one of the through-holes 13 accommodates a magnet 131 and at least a part of the through-holes accommodating no magnet 131 is filled with an electrically conductive material (not illustrated). When the rotor 10 is seen axially, at circumferential two sides of a magnetic flux passage that is close to the magnet 131, a width d1 of the magnetic flux passage near a first side S1 of the magnet 131 is larger than a width d2 of the magnetic passage near a second side S2 of the magnet 131.

As illustrated in FIG. 1A, for example, in a case where a magnet 131 is accommodated in a radially innermost one of the through-holes 13 in each through-hole group 12, a width d1 of a magnetic flux passage near a counterclockwise side S1 of the magnet 131 is larger than a width d2 of the magnetic flux passage near a clockwise side S2 of the magnet 131. A motor including the rotor 10 having this structure thus rotates counterclockwise.

As illustrated in FIG. 1B, in a case where magnets 131 are respectively accommodated in radially inner two of the through-holes 13 in each through-hole group 12, a width d1 of a magnetic flux passage near a counterclockwise side S1 of each magnet 131 is larger than a width d2 of the magnetic flux passage near a clockwise side S2 of the magnet 131. A motor including the rotor 10 having this structure thus rotates counterclockwise.

As illustrated in FIG. 1C, in a case where magnets 131 are respectively accommodated in all the through-holes 13 in each through-hole group 12, a width d1 of a magnetic flux passage near a counterclockwise side S1 of the magnet 131 in a middle one of the through-holes 13 can be made larger than a width d2 of the magnetic flux passage near a clockwise side S2 of the magnet 131. A motor including the rotor 10 having this structure thus rotates counterclockwise. In the case where the magnets 131 are accommodated in all the through-holes 13 as illustrated in FIG. 1C, the magnetic flux passage near the magnet 131 in the middle through-hole 13 does not necessarily have different widths. For example, the width d1 of the magnetic flux passage near the counterclockwise side S1 of the magnet 131 in each of the radially inner two through-holes 13 may be larger than the width d2 of the magnetic flux passage near the clockwise side S2 of the magnet 131. Alternatively, the width d1 of the magnetic flux passage near the counterclockwise side S1 of the magnet 131 in each of the three through-holes 13 may be larger than the width d2 of the magnetic flux passage near the clockwise side S2 of the magnet 131.

As illustrated in FIG. 2A, in a case where a magnet 131 is accommodated in a radially innermost one of the through-holes 13 in each through-hole group 12, a width d1 of a magnetic flux passage near a clockwise side S1 of the magnet 131 is larger than a width d2 of the magnetic flux passage near a counterclockwise side S2 of the magnet 131. A motor including the rotor 10 having this structure thus rotates clockwise.

As illustrated in FIG. 2B, in a case where magnets 131 are respectively accommodated in radially inner two of the through-holes 13 in each through-hole group 12, a width d1 of a magnetic flux passage near a clockwise side S1 of each magnet 131 is larger than a width d2 of the magnetic flux passage near a counterclockwise side S2 of the magnet 131. A motor including the rotor 10 having this structure thus rotates clockwise.

As illustrated in FIG. 2C, in a case where magnets 131 are respectively accommodated in all the through-holes 13 in each through-hole group 12, a width d1 of a magnetic flux passage near a clockwise side S1 of the magnet 131 in a middle one of the through-holes 13 can be made larger than a width d2 of the magnetic flux passage near a counterclockwise side S2 of the magnet 131. A motor including the rotor 10 having this structure thus rotates clockwise. In the case where the magnets 131 are accommodated in all the through-holes 13 as illustrated in FIG. 2C, the magnetic flux passage near the magnet 131 in the middle through-hole 13 does not necessarily have different widths. For example, the width d1 of the magnetic flux passage near the clockwise side S1 of the magnet 131 in each of the radially inner two through-holes 13 may be larger than the width d2 of the magnetic flux passage near the counterclockwise side S2 of the magnet 131. Alternatively, the width d1 of the magnetic flux passage near the clockwise side S1 of the magnet 131 in each of the three through-holes 13 may be larger than the width d2 of the magnetic flux passage near the counterclockwise side S2 of the magnet 131.

This configuration increases a width of a magnetic flux passage near a first side of a magnet, thereby improving a saturated situation of a magnetic flux density, increasing a reluctance torque while holding the self-starting characteristic of a motor, and improving the performance of the motor through the effective use of the magnet.

According to one or more example embodiments, as illustrated in FIGS. 1A, 1B, 1C, 2A, 2B, and 2C, when the rotor 10 is seen axially, for example, each magnet 131 may be located at a substantially circumferentially middle position of the through-hole 13 accommodating the magnet 131. This configuration increases a magnetic flux torque of the rotor 10. However, the present application is not limited to this configuration. For example, each magnet 131 may be located at any position of the through-hole 13 accommodating the magnet 131.

According to one or more example embodiments, as illustrated in FIGS. 1A, 1B, 1C, 2A, 2B, and 2C, when the rotor 10 is seen axially, the through-hole groups 12 are arranged circumferentially at equal spacings, and the through-holes in each through-hole group 12 are arranged in radially parallel to one another.

This configuration achieves balanced lines of magnetic force in the rotor 10, resulting in uniform magnetic fluxes.

According to one or more example embodiments, as illustrated in FIGS. 1A, 1B, 1C, 2A, 2B, and 2C, each electromagnetic steel plate 11 may have four through-hole groups 12. However, the present application is not limited to this configuration. In other words, the number of through-hole groups 12 is not limited to four. Typically, the number of through-hole groups may be determined in accordance with the number of poles in a reluctance motor.

As illustrated in FIGS. 1A, 1B, 1C, 2A, 2B, and 2C, each through-hole group 12 includes three through-holes 13. However, the present application is not limited to this configuration. In other words, the number of through-holes 13 in each through-hole group 12 is not limited to three.

According to one or more example embodiments, in each through-hole group 12, the through-hole 13 accommodating the magnet 131 is located radially inward of the through-hole group 12. More specifically, as illustrated in FIGS. 1A and 2A, for example, in the case where the magnet 131 is accommodated in one of the through-holes 13 in each through-hole group 12, the magnet 131 is located in the radially innermost through-hole 13. As illustrated in FIGS. 1B and 2B, in the case where the magnets 131 are accommodated in two of the through-holes 13 in each through-hole group 12, the magnets 131 are respectively located in the radially inner two through-holes 13.

According to one or more example embodiments, each through-hole 13 accommodating no magnet 131 is filled with the electrically conductive material (not illustrated). For example, a space of each through-hole 13 accommodating no magnet 131 may be filled with the electrically conductive material. This configuration effectively secures the self-starting characteristic of a motor including the rotor 10. However, the present application is not limited to this configuration. For example, a part of the space of each through-hole 13 accommodating no magnet 131 may be filled with the electrically conductive material.

Figure 3A:
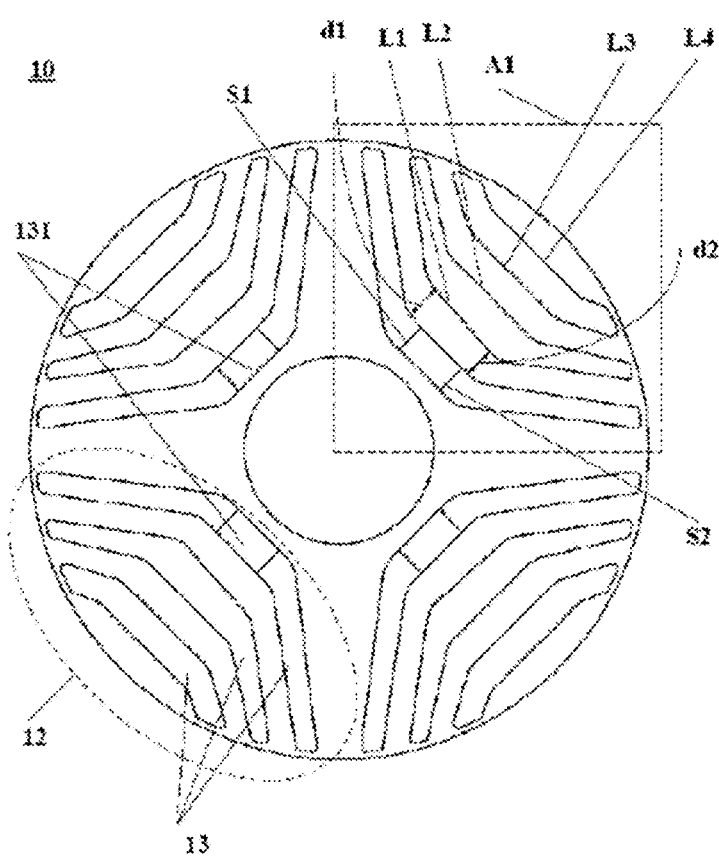
FIG. 3A is a plan view of still another rotor according to an example embodiment of the first aspect of the present application.
Figure 3B:
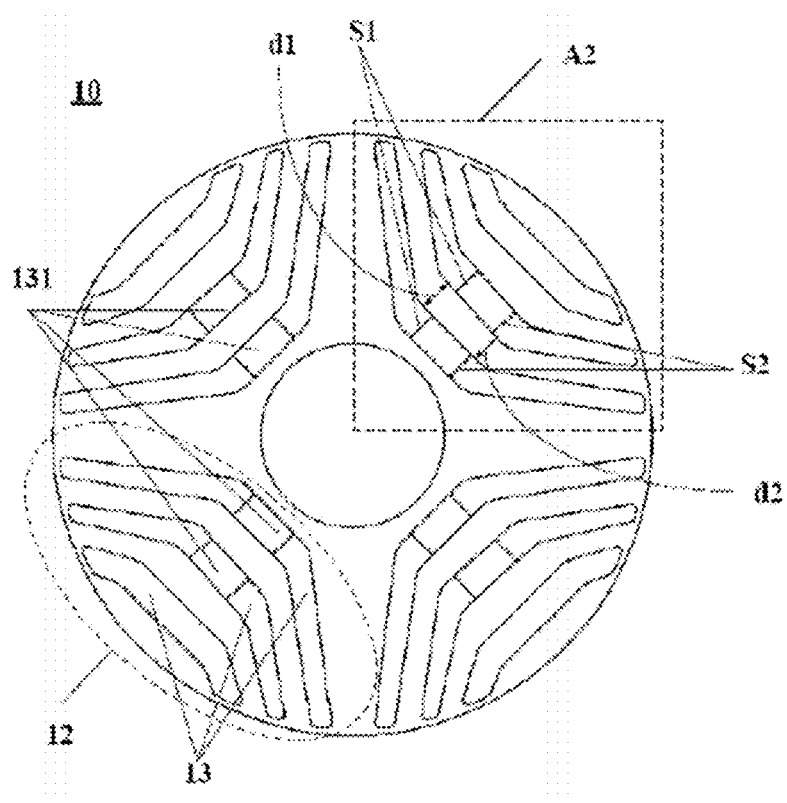
FIG. 3B is a plan view of still another rotor according to the example embodiment of the first aspect of the present application.
Figure 3C:
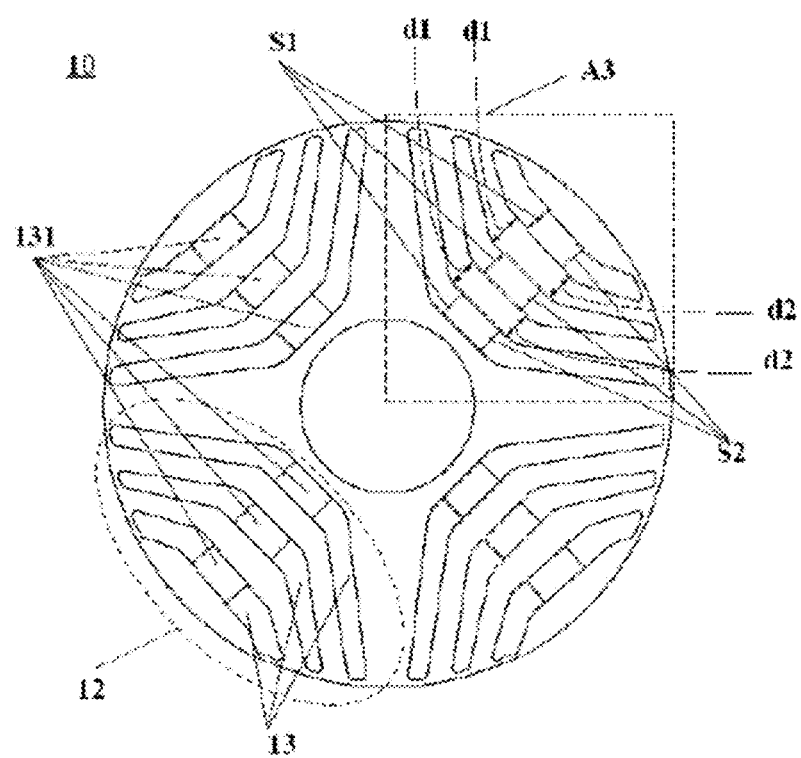
FIG. 3C is a plan view of still another rotor according to the example embodiment of the first aspect of the present application.
Figure 4A:
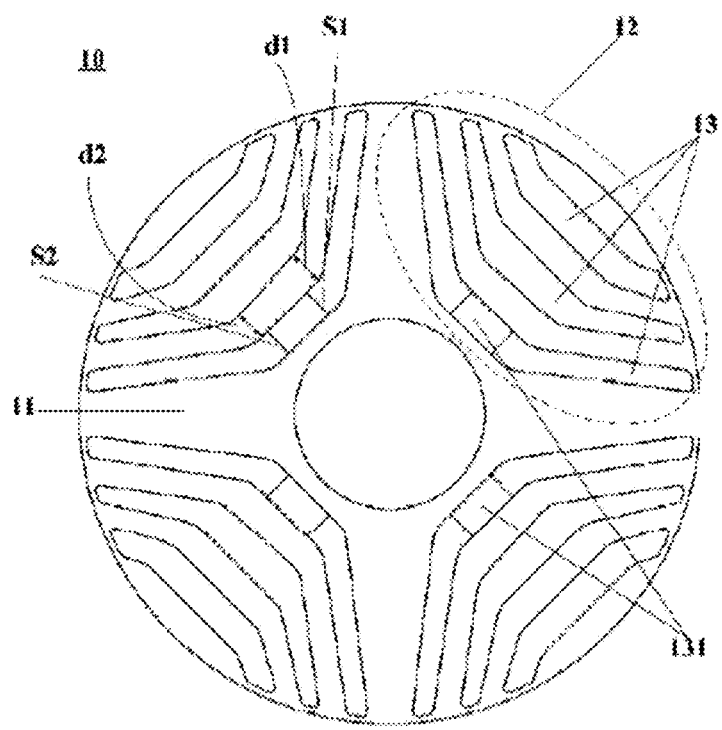
FIG. 4A is a plan view of yet another rotor according to the example embodiment of the first aspect of the present application.
Figure 4B:
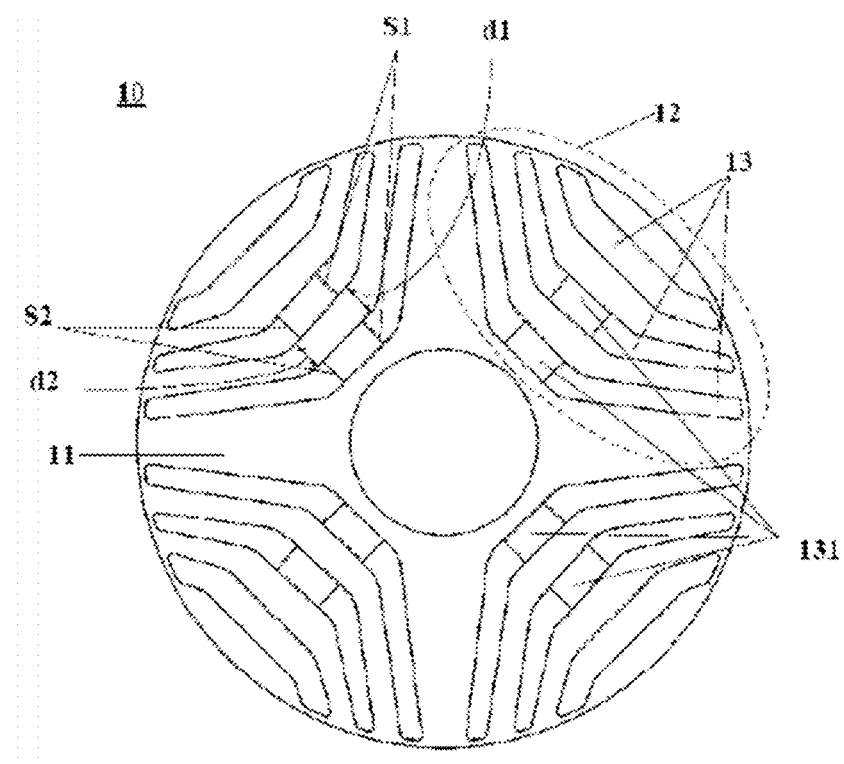
FIG. 4B is a plan view of yet another rotor according to the example embodiment of the first aspect of the present application.
Figure 4C:
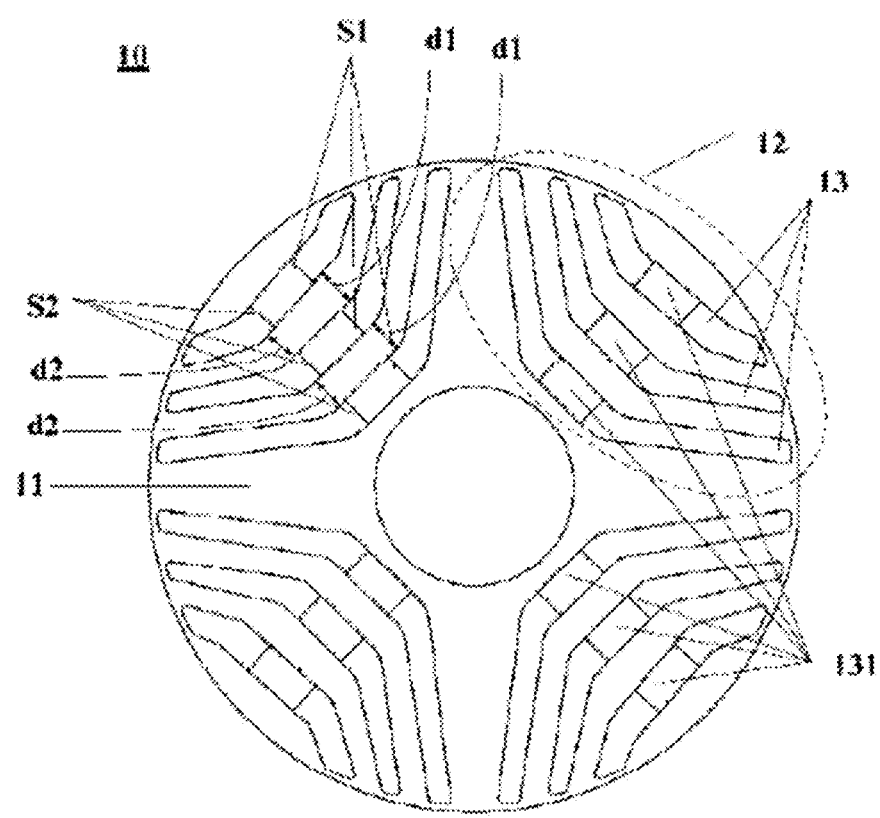
FIG. 4C is a plan view of yet another rotor according to the example embodiment of the first aspect of the present application.
Figure 5:
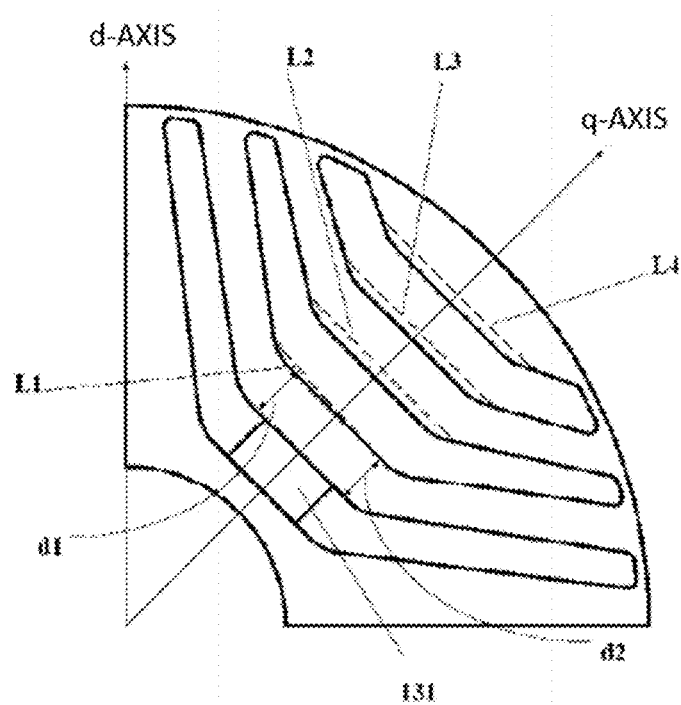
FIG. 5 is an enlarged view of a dotted frame A1 in FIG. 3A.
Figure 6:
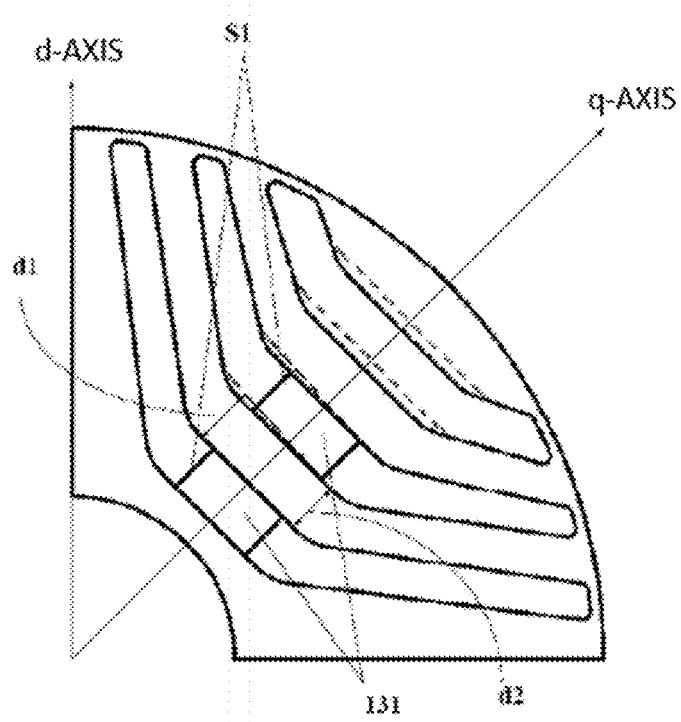
FIG. 6 is an enlarged view of a dotted frame A2 in FIG. 3B.
Figure 7:
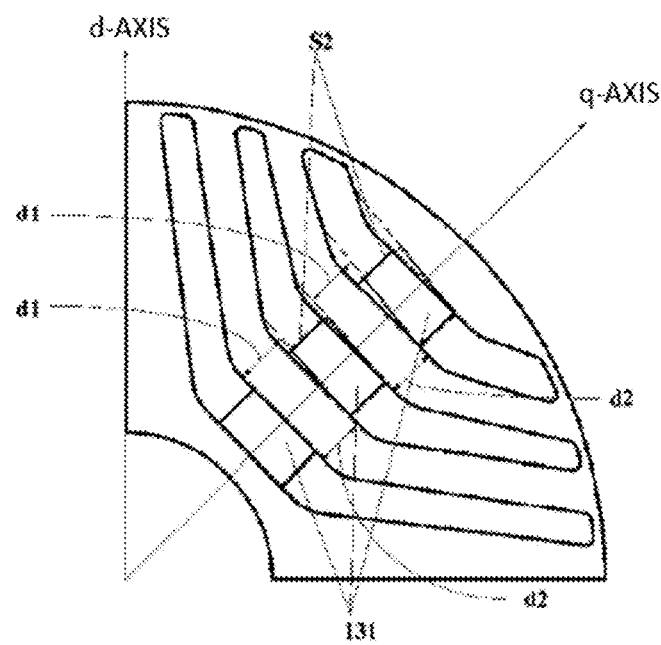
FIG. 7 is an enlarged view of a dotted frame A3 in FIG. 3C.

FIGS. 3A, 3B, and 3C are plan views of still another exemplary rotor according to the example embodiment of the first aspect of the present application. FIG. 3A illustrates a state in which magnets are accommodated in one layer. FIG. 3B illustrates a state in which magnets are accommodated in two layers. FIG. 3C illustrates a state in which magnets are accommodated in three layers. FIGS. 4A, 4B, and 4C are plan views of yet another exemplary rotor according to the example embodiment of the first aspect of the present application. FIG. 4A illustrates a state in which magnets are accommodated in one layer. FIG. 4B illustrates a state in which magnets are accommodated in two layers. FIG. 4C illustrates a state in which magnets are accommodated in three layers. FIG. 5 is an enlarged view of a dotted frame A1 in FIG. 3A. FIG. 6 is an enlarged view of a dotted frame A2 in FIG. 3B. FIG. 7 is an enlarged view of a dotted frame A3 in FIG. 3C.

According to one or more example embodiments, the following method makes a width d1 of a magnetic flux passage near a first side S1 of a magnet 131 larger than a width d2 of the magnetic flux passage near a second side S2 of the magnet 131.

As illustrated in FIGS. 1A, 1B, 1C, 2A, 2B, and 2C, for example, each through-hole 13 accommodating the corresponding magnet 131 has an uneven radial width. When the rotor 10 is seen axially, a radial width D1 of each through-hole 13 that is in close contact with a first side S1 of the corresponding magnet 131 is smaller than a radial width D of the magnet 131. As illustrated in FIGS. 1A, 1B, and 1C, a radial width D1 of each through-hole 13 that is in close contact with a counterclockwise side S1 of the corresponding magnet 131 is smaller than a radial width D of the magnet 131. A motor including the rotor 10 having this structure thus rotates counterclockwise. As illustrated in FIGS. 2A, 2B, and 2C, a radial width D1 of each through-hole 13 that is in close contact with a clockwise side S1 of the corresponding magnet 131 is smaller than a radial width D of the magnet 131. A motor including the rotor 10 having this structure thus rotates clockwise.

According to an example embodiment of the present application, for example, a radial width D1 of each through-hole 13 at a position where the through-hole 13 is in close contact with the corresponding magnet 131 may be smaller than a radial width D of the magnet 131, in addition to the structures of the rotor illustrated in FIGS. 1A, 1B, 1C, 2A, 2B, and 2C. For example, the radial widths D1 of the through-holes 13 that are in close contact with circumferentially opposite sides of the corresponding magnet 131 may be smaller than the radial width D of the magnet 131. In this case, a motor including the rotor 10 having this structure may rotate clockwise or may rotate counterclockwise.

As illustrated in FIGS. 3A, 3B, 3C, 4A, 4B, and 4C, for example, when the rotor 10 is seen axially, in each through-hole group 12, first side S1-ends of the magnets 131 except the radially innermost magnet 131 are inclined radially outward. As illustrated in FIGS. 3B and 6, for example, a counterclockwise side S1-end of the middle magnet 131 is inclined radially outward. As illustrated in FIGS. 3C and 7, alternatively, the counterclockwise side S1-end of the middle magnet 131 and a counterclockwise side S1-end of the radially outermost magnet 131 are inclined radially outward. A motor including the rotor 10 having this structure thus rotates counterclockwise. As illustrated in FIG. 4B, a clockwise side S1-end of the middle magnet 131 is inclined radially outward. As illustrated in FIG. 4C, alternatively, the clockwise side S1-end of the middle magnet 131 and a clockwise side S1-end of the radially outermost magnet 131 are inclined radially outward. A motor including the rotor 10 having this structure thus rotates clockwise.

As illustrated in FIGS. 3A and 5, the magnet 131 is located in the radially innermost through-hole 13. In this case, as illustrated in FIG. 5, middle portions of the through-holes 13 accommodating no magnet 131 may be shifted radially outward. Since the magnet 131 is located in the radially innermost through-hole 13, a magnetic flux density saturation phenomenon occurs only in the radially innermost magnetic flux passage. Therefore, a left side of a radially inner edge L1 at a middle portion of the middle through-hole 13 is inclined radially outward (L1 thus inclined is indicated by a dotted line; in FIG. 3A, L1 inclined radially outward is indicated by a solid line), while a right side of the radially inner edge L1 at the middle portion remains unchanged. A radially outer edge L2 of the middle through-hole 13, a radially inner edge L3 of the radially outermost through-hole 13, and a radially outer edge L4 of the radially outermost through-hole 13 are subjected to parallel translation radially outward (L2, L3, and L4 thus subjected to parallel translation are each indicated by a dotted line; in FIG. 3A, L2, L3, and L4 subjected to parallel translation radially outward are each indicated by a solid line). A motor including the rotor 10 having this structure thus rotates counterclockwise. The structure illustrated in FIG. 4A is similar to that illustrated in FIG. 3A. A motor including the rotor 10 having the structure illustrated in FIG. 4A rotates clockwise.

This configuration also increases a width of a magnetic flux passage near a first side S1 of a magnet 131, thereby improving a saturated situation of a magnetic flux density.

According to an example embodiment of the present application, as illustrated in FIGS. 6 and 7, a d-axis represents a center axis of a magnetic pole in the rotor 10, and a q-axis represents an axis different by 45° from the d-axis.

When the rotor 10 is seen axially, a center of the magnet 10 is on the q-axis and, in each through-hole group 12, second side S2-ends of the magnets 131 except the radially innermost magnet 131 are inclined radially inward (not illustrated in FIGS. 6 and 7). This configuration also increases a width of a magnetic flux passage near a first side S1 of a magnet 131, thereby improving a saturated situation of a magnetic flux density.

In each through-hole group 12, the through-holes 13 accommodating the magnets 131 except the radially innermost magnet 131 each have a portion shifted radially outward of the q-axis. As illustrated in FIG. 6, more specifically, a middle portion of the middle through-hole 13 is shifted radially outward of the q-axis with respect to the remaining portion of the middle through-hole 13, and the magnet 131 is located at the middle portion of the middle through-hole 13. Therefore, the magnet 131 in the middle through-hole 13 is shifted radially outward of the q-axis with respect to the remaining portion of the middle through-hole 13. In other words, a middle portion of the radially outermost through-hole 13 accommodating no magnet 131 is shifted radially outward (the middle portion thus subjected to parallel translation is indicated by a dotted line; the shifting method is similar to that described with reference to FIG. 5 and, therefore, the description thereof will not be given here). As illustrated in FIG. 7, the middle portion of the middle through-hole 13 and the middle portion of the radially outermost through-hole 13 are shifted radially outward of the q-axis with respect to the remaining portions of the respective through-holes 13, and the magnets 131 are located at the middle portions of the respective through-holes 13. Therefore, the magnet 131 in the middle through-hole 13 and the magnet 131 in the radially outermost through-hole 13 are shifted radially outward of the q-axis with respect to the remaining portions of the respective through-holes 13. This configuration also increases a width of a magnetic flux passage near a first side S1 of a magnet 131, thereby improving a saturated situation of a magnetic flux density.

According to an example embodiment of the present application, the method of making a width of a magnetic flux passage near a first side S1 of a magnet 131 larger than a width of the magnetic flux passage near a second side S2 of the magnet 131 is not limited to that described above. In other words, the present application involves any method of making a width of a magnetic flux passage near a first side S1 of a magnet 131 larger than a width of the magnetic flux passage near a second side S2 of the magnet 131.

According to an example embodiment of the present application, a configuration of a rotor increases a width of a magnetic flux passage near a first side of a magnet 10, thereby improving a saturated situation of a magnetic flux density and improving the performance of a motor through the effective use of the magnet.

Figure 8:
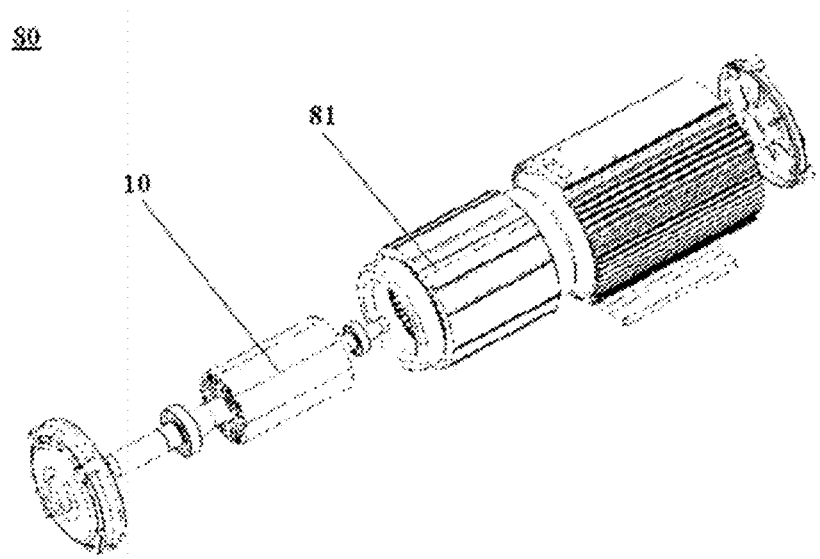
FIG. 8 is an exploded schematic view of a motor according to an example embodiment of the second aspect of the present application.

An example embodiment of a second aspect of the present application provides a motor. FIG. 8 is an exploded schematic view of the motor according to the example embodiment of the second aspect of the present application.

As illustrated in FIG. 8, a motor 80 includes: a stacked core; a stator 81 including a plurality of pole slots (not illustrated) arranged circumferentially, a plurality of teeth (not illustrated) each disposed between adjacent two of the pole slots, and a plurality of coils (not illustrated) respectively accommodated in the pole slots; and a rotor 10 that is radially opposite the stator 81 and is axially rotatable about an axis of the motor 80. In the example embodiment of the first aspect of the present application, the structure of the rotor 10 has already been described in detail; therefore, the contents thereof are included herein and the related description will not be given here.

According to one or more example embodiments, other constituent components of the motor 80 are equal to those in the technical background; therefore, the description thereof will not be given here.

According to an example embodiment of the present application, a configuration of a rotor for a motor increases a width of a magnetic flux passage near a first side of a magnet 10, thereby improving a saturated situation of a magnetic flux density and improving the performance of the motor through the effective use of the magnet.

An example embodiment of a third aspect of the present application provides a drive device including the motor according to the example embodiment of the second aspect of the present application. In the example embodiment of the second aspect of the present application, the main structure of the motor has already been described in detail; therefore, the contents thereof are included herein and the related description will not be given here.

According to one or more example embodiments, the drive device may be any device including a motor. The motor is applicable to power transmission by, for example, an industrial motor, a compression pump, and a home appliance.

According to an example embodiment of the present application, a structure of a motor for a drive device adjusts an angle formed by an electric current upon production of a maximum reluctance torque, thereby bringing an angle formed by an electric current upon production of a maximum magnetic flux torque close to or equal to an angle formed by an electric current upon production of a maximum reluctance torque as much as possible, optimizing a combination of a reluctance torque and a magnetic flux torque, and achieving an optimal utilization factor with the aid of a magnet.

The present application has been described above in combination with specific example embodiments. However, those skilled in the art should understand that the description is merely exemplary, rather than a limitation to the protection scope of the present application. Those skilled in the art can make various variations and modifications to the present application, based on the spirit and principle of the present application. These variations and modifications shall also fall within the scope of the present application.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
   a stack of electromagnetic steel plates each including through-hole groups with through-holes extending through the respective electromagnetic steel plates; wherein
   in each of the through-hole groups, at least one of the through-holes accommodates a magnet and at least a portion of the through-holes that does not accommodate any magnet is filled with an electrically conductive material; and
   when the rotor is seen axially, at two circumferential sides of a magnetic flux passage that is adjacent to the magnet, a width of the magnetic flux passage adjacent a first side of the magnet is larger than a width of the magnetic flux passage adjacent a second side of the magnet.

2. The rotor according to claim 1, wherein, when the rotor is seen axially, the magnet is located at a circumferentially middle position of the at least one through-hole.

3. The rotor according to claim 1, wherein
   the at least one through-hole accommodating the magnet has an uneven radial width; and
   when the rotor is seen axially, a radial width of the at least one through-hole that is in close contact with the first side of the magnet is smaller than a radial width of the magnet.

4. The rotor according to claim 1, wherein when the rotor is seen axially, the through-hole groups are circumferentially arranged at equal or substantially equal spacings.

5. The rotor according to claim 1, wherein when the rotor is seen axially, the through-holes in each through-hole group are arranged radially parallel to one another.

6. The rotor according to claim 1, wherein in each of the through-hole groups, the through-holes that do not accommodate any magnet are located radially inward of the through-hole group.

7. The rotor according to claim 1, wherein the through-holes that do not accommodate any magnet are filled with the electrically conductive material.

8. The rotor according to claim 1, wherein when the rotor is seen axially, in each of the through-hole groups, first side-ends of magnets, except for one of the magnets that is located at a radially innermost side of the through-hole group, are inclined radially outward.

9. The rotor according to claim 8, wherein
   on a condition that a d-axis represents a center axis of a magnetic pole in the rotor and a q-axis represents an axis different by about 45° from the d-axis when the rotor is seen axially; and
   a center of the magnet is on the q-axis and, in each of the through-hole groups, second side-ends of the magnets, except for the one of the magnets located at the radially innermost side of the through-hole group, are inclined radially inward.

10. The rotor according to claim 9, wherein in each of the through-hole groups, the through-holes accommodating the magnets, except for the one of the magnets located at the radially innermost side of the through-hole group, each include a portion shifted radially outward of the q-axis.

11. A motor comprising:
a stacked core;
a stator including:
   pole slots arranged circumferentially;
   teeth each arranged between adjacent pairs of the pole slots; and
   coils accommodated in the respective pole slots; and
the rotor according to claim 1; wherein
the rotor is radially opposed to the stator and is axially rotatable about an axis of the motor.

12. A drive device comprising
the motor according to claim 11.

* * * * *